July 18, 1967 TOSHIO ANDO 3,332,062

MULTIPLE FREQUENCY SELECTING SIGNAL STORAGE CONTROL CIRCUIT

Filed June 5, 1963 2 Sheets-Sheet 1

INVENTOR.
TOSHIO ANDO

BY Haggard & Calimafde
ATTORNEY

July 18, 1967 TOSHIO ANDO 3,332,062

MULTIPLE FREQUENCY SELECTING SIGNAL STORAGE CONTROL CIRCUIT

Filed June 5, 1963

2 Sheets-Sheet 2

INVENTOR.
TOSHIO ANDO

BY Hoggard & Colimaple
ATTORNEY

United States Patent Office 3,332,062
Patented July 18, 1967

3,332,062

MULTIPLE FREQUENCY SELECTING SIGNAL STORAGE CONTROL CIRCUIT

Toshio Ando, Tokyo, Japan, assignor to Nippon Electric Company, Inc., Tokyo, Japan, a corporation of Japan Filed June 5, 1963, Ser. No. 285,791
3 Claims. (Cl. 340—146.1)

This invention relates to a multiple frequency selecting signal storage control circuit having an error check function for the storage of selecting signals in the multiple frequency incoming register of a crossbar automatic switchboard.

The forms of selecting signals in a crossbar automatic switchboard may be divided roughly into two types; one is the dial pulse type in which the numbers are discriminated by a series of direct current pulses; and the other is the multiple frequency type in which the numbers are discriminated by a combination of two audio frequency signals out of five. Examples of these frequencies are 700, 900, 1100, 1300, and 1500 cycles per second.

Where the latter method, the one with which this invention primarily deals, is employed the selecting signal is received in the multiple frequency incoming register of a crossbar automatic switchboard in multiple frequency form. It is then stored as a combination of two out of five audio frequencies which will be abbreviated hereinafter as "2 out of 5." In the conventional multiple frequency incoming register, however, erroneous storage occurs frequently due to storage in the form of "1 out of 5," "3 out of 5," "4 out of 5," "5 out of 5," or nothing out of five, which is no storage.

The above mentioned defect, in the conventional system, is apparently derived from other components arising from clicks, as well as erroneous operations by the telephone operators.

It is therefore an object of the present invention to provide a multiple frequency selecting signal storage control circuit in which signals of erroneous combination of audio frequencies; selecting signals comprising a pair of frequencies having excessively short duration; and signals having too short an interval between them, are detected as fault pulses and avoided from the storage so that erroneous storage is eliminated and the aforementioned defects in the conventional device are obviated.

The above mentioned and other features and objects of this invention and the manner of attaining them will become more apparent and the invention itself will best be understood by reference to the following description of an embodiment of the invention taken in conjunction with the accompanying drawings wherein.

Figure 1:
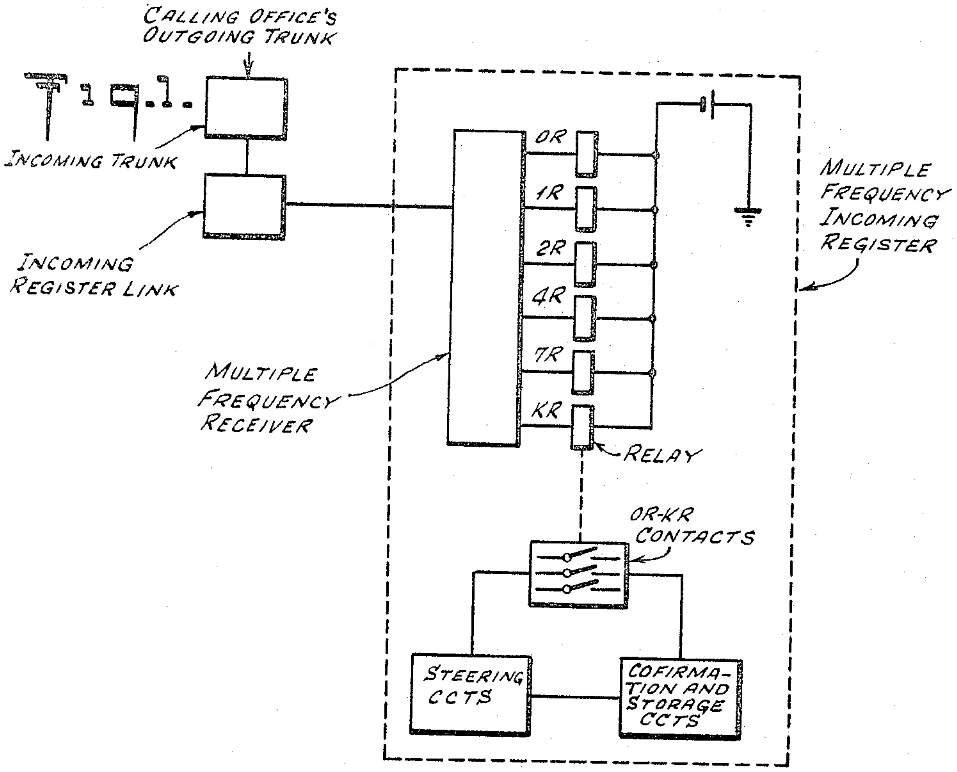
FIG. 1 illustrates a block diagram of the present invention.

Referring now to FIG. 1 it may be seen that the selecting signal, comprising a pair of audio frequencies, is transmitted to the multiple frequency receiver (which is a part of the multiple frequency incoming register) through the incoming trunk, directly connected with the outgoing trunk of the calling office, and the incoming register link (connecting the incoming trunk to the multiple frequency incoming register). In the receiver the selecting signal will be amplified and separated by filters resonant to each of the audio frequencies employed (i.e. 700, 900, 1100, 1300 and 1500 c.p.s.) and the filter outputs then rectified to operate the output relays 0R, 1R, 2R, 4R and 7R, each of which corresponds to one of the basic frequencies, above mentioned. Although the above is well known in the art it is deemed worth repeating here in order to lay a proper foundation for explaining the invention.

At this point it is to be noted that for each incoming selecting signals, or number, only two of the relays should operate; where more or less of the relays respond the result is in error. For this purpose, and the others alluded to herein, the steering and confirmation and storage circuits, shown connected to the contacts of the 0R–KR relays and to each other are provided in the multiple frequency incoming register.

Turning now to the detailed description of the invention reference will be made to FIGS. 2 and 3 in each of which the contacts of the relays 0R, IR . . . KR above referred to are shown in circuit. FIG. 4 the basic timing diagram for the invention will then be described in order to bring the inventive concept more clearly to mind. It bears mentioning that in each of FIGS. 2 and 3 the suffix notations (e.g. the 1 in $KR_1$, the 3 in $2R_3$, the 9 in $BS_9$ and so forth) indicate the numbered contact of the corresponding relay.

Figure 2:
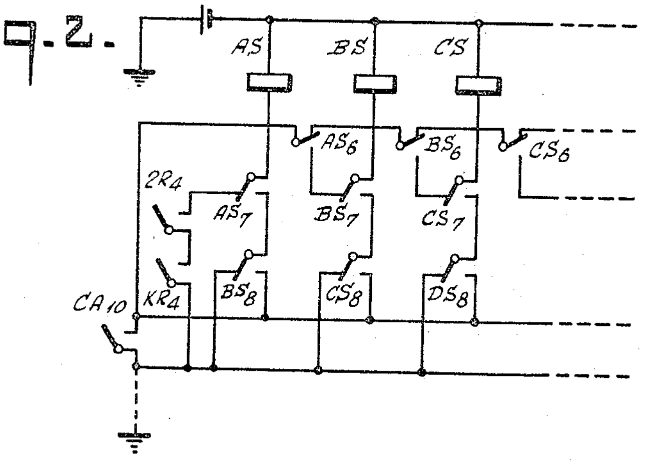
FIG. 2 shows the steering relays and associated circuitry.
Figures 3, 4:
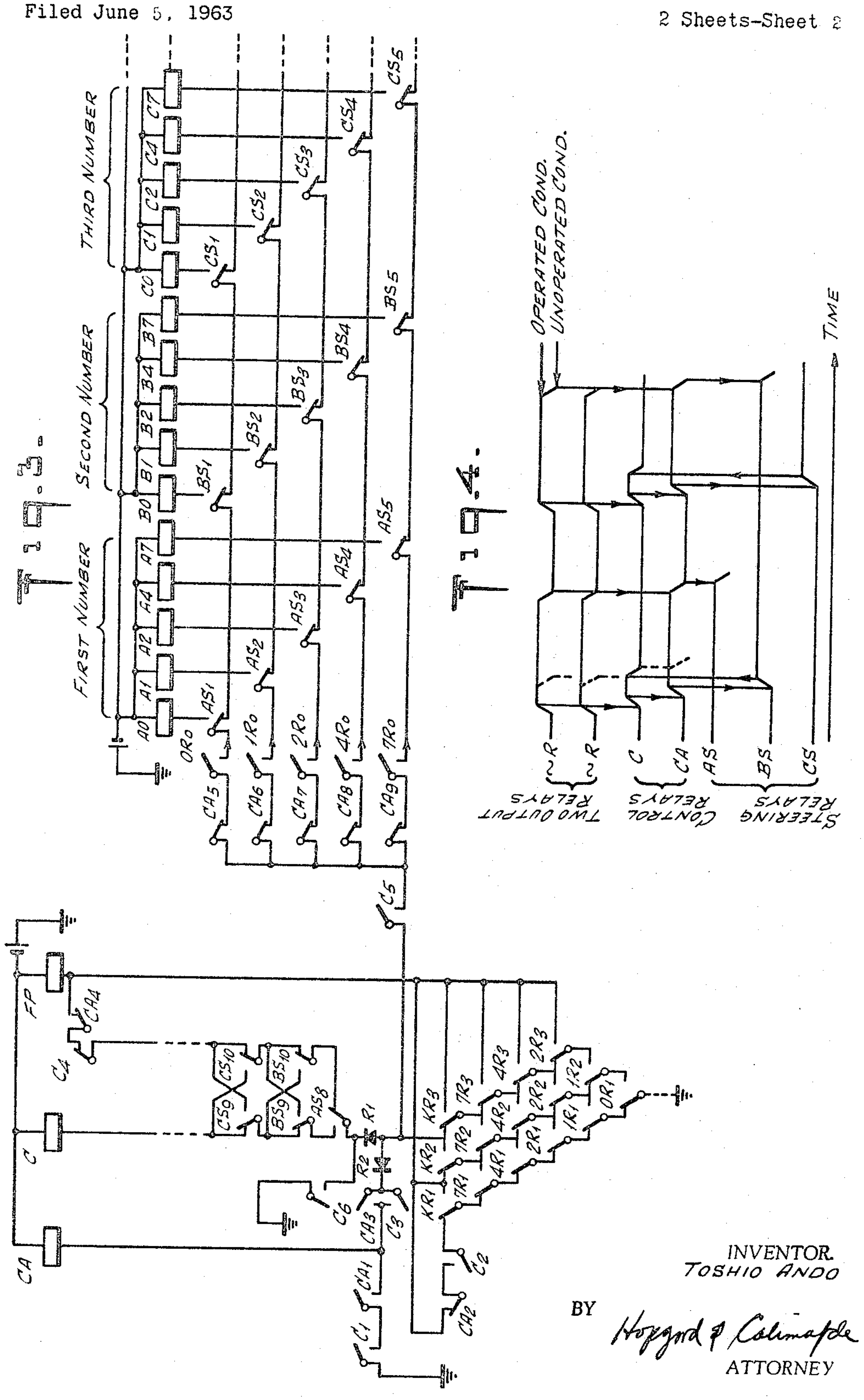
FIG. 3 illustrates the final selecting signal storage circuits and the confirmation and fault detecting circuits relating to the storage.
FIG. 4 is a time graph illustrating the operation of the relays used in the circuits of FIGS. 2 and 3.

FIG. 2 shows the steering circuit relays AS, BS, CS, etc. which are operatively connected to contacts of the R relays of FIG. 1 for initiating the operation of the storage relays A0 A0 . . . B0, $B0_1$ . . . C0 $C0_1$, etc. of FIG. 3. The storage relays serve to store each number (selecting signal) in a 2 out of 5 code.

The storage of the first number will be performed, after confirming the operation of two output relays 0R–7R, by operating two of the storage relays A0–A7 corresponding to the operated output relays. The storage relays A0–A7 are associated with the first relay AS of the steering circuit. The storage of the second number of the selecting signal will be performed by operating two of the storage relays B0–B7 corresponding to the operated output relays, after the operation of the second relay BS in the steering circuit and the restoration of the first relay AS, and so forth with the following numbers.

The steering circuit of FIG. 2 operates as follows: an "on" signal consisting of the pair of frequencies 1100 and 1700 c.p.s. are received precedently before receiving the selecting signal. This pair of signals operates the output relays 2R and KR for a very stort time causing the first relay AS in the steering circuit to operate by completing the circuit through the moving contact of $KR_4$—the moving contact of $2R_4$—and the fixed contact of AS7.

Subsequently to the initiation signal the first number is received. In the example to follow it will be assumed that the first number comprises frequencies corresponding to relays 0R and 2R. Turning to FIG. 3 the check relay C in the confirmation circuit is operated by completing the circuit through the moving contact of 0R1—the fixed contact of 1R2—the moving contact of 2R2—the fixed contact of 4R3—the fixed contact of 7R3—the fixed contact of KR3—the rectifier R1—the moving contact AS8 of the first relay AS in the steering circuit—the fixed contact BS9 of the second relay BS—and the fixed contacts of the relays belonging to the subordinate order (shown by the dotted line) after confirming the operation of the first relay AS. It may be seen that where only one, or more than two output relays operate, the check relay C will not operate and the fault pulse detecting relay FP will be operated through the fixed contact of 0R1—the fixed contact of 1R1—the moving contact of 2R1—the fixed contact of 4R2—the fixed contact of 7R2—and the fixed contact of KR2; or through the moving contact of 0R1—the moving contact of 1R2—the moving contact of 2R3. If the operated output relays 0R and 2R are restored before the operation of the check relay C, the applied selecting signal is ignored and is of no effect.

When the check relay C is operated, the storage relays A0 and A2 (corresponding to the previously operated output relays 0R and 2R) which will be connected in circuit by the first relay AS (via AS1–AS5) of the steering circuit, may be operated by the moving contact of 0R1—the fixed contact of 1R2—the moving contact of 2R2—the fixed contact of 4R3—the fixed contact of 7R3—the fixed contact of KR3—the moving contact of C5—the fixed contact of CA5—the moving contact of 0R0—and the moving contact of AS1—relay A0; and another pass through the moving contact of C5—the fixed contact of CA7—the moving contact of 2R0—and the moving contact of AS3—relay A2.

On the other hand, the relay CA for confirming the restoration of the output relay 0R and 2R may be operated through the moving contact 0R1—the fixed contact of IR2—the moving contact of 2R2—the fixed contact of 4R3—the fixed contact of KR3—rectifier R2—and the moving contact of C3. Thus the circuit from the output contact of the output relays to the storage circuit will be opened by the opening of the contacts CA5–9, and the second relay BS (see FIG. 2) of the steering circuit may be operated through the moving contact of CA10—the moving contact of AS6—and the fixed contact of BS7.

The check relay C will be restored when the second relay BS is operated. The relay CA for confirming the restoration of the output relays will be restored when the operating output relays 0R and 2R are restored. If the check relay C is not restored, the relay CA for confirming the restoration of the output relays will hold by the moving contact of C1 and moving contact of CA1 and will not be restored even if the operating output relays 0R and 2R are restored.

When the relay CA for confirming the restoration of the output relays is restored, the first relay AS of the steering circuit will be restored since the holding circuit consisting of the moving contact of CA10, the moving contact of BS8 and the moving contact of AS7 is open.

In the case of the operation of the output relays 0R and 4R, for example, by an incoming selecting signal before the restoring of the first relay AS of the steering circuit, the fault pulse detecting relay $F_p$ will be operated by completing the circuit through the moving contact of 0R1—the fixed contact of 1R2—the fixed contact of 2R2—the moving contact of 4R2—the fixed contact of 7R3—the fixed contact of KR3—rectifier R1—the moving contact of AS8—the moving contact of BS9—the fixed contact of CS10—the other fixed contact of the steering circuit—the fixed contact of C4—and the contact of CA4.

FIG. 4 illustrates the operation of two of the output relays 0R, 1R, 2R, 4R, 7R, KR, and of the relays C, CA, AS, BS, and CS used in the above disclosed embodiment of the present invention. It may be seen that AS operates initially as described followed by two of the R relays (e.g. 0R and 2R). The two R relays initiate the operation of the C relay, these being the correct number of incoming signals, which in turn causes the energization of the CA relay. CA operates BS causing C to restore. When the output R relays restore this restores CA which in turn restores AS and the first cycle for the first number is complete. A second similar cycle is initiated by the second number this time affecting CS rather than BS and so on.

The features of the invention may be enumerated as follows:

(1) The operating condition of the check relay C includes that one of the relays of the steering circuit which is operating.

(2) The relay CA for confirming the restoration of the output relays is operated by the check relay C, and relay CA controls the steering circuit.

(3) In the case of the restoration of the output relays before operation of the check relay C, the selecting signal is ignored.

(4) The storage relays are operated in the period from the operation of the check relay C to the operation of the relay confirming the restoration of the output relays.

(5) The fault pulse detecting relay FP will be operated to indicate a fault when all of the output relays are restored after the operation of the check relay C and before the operation of the relay CA for confirming the restoration of the output relays.

(6) The fault pulse detecting relay FP will be operated to indicate a fault in the case of the reception of a succeeding selecting signal during the time when two of the relays of the steering circuit are still operating.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. A selecting signal storage control circuit for a multiple frequency receiver, having output storage devices selectively operated by selecting signals in the form of a combination of individual frequency signals, comprising means coupled to said output storage devices for checking the operation of a predetermined number of said storage devices; a plurality of groups of final storage devices; means under control of said checking means for causing a store, corresponding to said selectively operated output storage devices, in said final storage devices; steering circuit means for sequentially allocating one group of said final storage devices at a time for storage; means in series with said checking means for preventing the operation thereof in response to a malfunction in the allocation of said final storage devices; and confirming means in series with said final storage devices for preventing any further sequential allocation thereof until said output storage devices are restored; and means for controlling said steering circuit means with said confirming means.

2. A selecting signal storage control circuit as claimed in claim 1 in which said output storage devices are relays, the checking means comprising a check relay, at least one contact of which is disposed in series with said final storage devices; said check relay and said output storage relay contacts being serially interconnected for the energization of said check relay when a predetermined number of said output storage relays are energized.

3. The selecting signal storage control circuit as claimed in claim 1 wherein said confirming means is responsive to the operation of said checking means, said circuit further comprising means responsive to the operation of said steering circuit means for restoring said checking means.

References Cited

UNITED STATES PATENTS

| | | | |
|---|---|---|---|
| 2,460,702 | 2/1949 | Mallery. | |
| 2,470,145 | 5/1949 | Clos. | |
| 2,471,126 | 5/1949 | Spencer et al. | |
| 2,696,599 | 12/1954 | Holbrook et al. ---- | 340—146.1 |
| 3,011,148 | 11/1961 | Sauter ------------ | 340—146.1 |

MALCOLM A. MORRISON, *Primary Examiner.*

M. P. ALLEN, K. MILDE, *Assistant Examiners.*